(12) United States Patent
Hulet et al.

(10) Patent No.: US 8,755,947 B2
(45) Date of Patent: Jun. 17, 2014

(54) ROLLER DETECTION

(75) Inventors: Craig Hulet, Calgary (CA); Joel Racle, Bright's Grove (CA); Ian Woods, Strathroy (CA); Benjamin Milton Shaw, Calgary (CA); Yves Lacombe, Calgary (CA)

(73) Assignee: Nova Chemicals (International) S.A., Fribourg (CH)

( * ) Notice: Subject to any disclaimer, the term of this patent is extended or adjusted under 35 U.S.C. 154(b) by 95 days.

(21) Appl. No.: 13/135,987

(22) Filed: Jul. 19, 2011

(65) Prior Publication Data

US 2013/0022498 A1    Jan. 24, 2013

(51) Int. Cl.
  *G05D 23/00*    (2006.01)
(52) U.S. Cl.
  USPC .......................................... 700/299; 700/266
(58) Field of Classification Search
  CPC ........................... C08F 2400/02; B01J 8/0496
  USPC ........................ 700/299; 702/99, 130; 436/55
  See application file for complete search history.

(56) References Cited

U.S. PATENT DOCUMENTS

| | | | |
|---|---|---|---|
| 3,079,372 A | | 2/1963 | Fulkner et al. |
| 3,334,081 A | | 8/1967 | Madgwick et al. |
| 3,399,185 A | | 8/1968 | Schappert |
| 3,781,256 A | | 12/1973 | Sadee et al. |
| 3,917,577 A | | 11/1975 | Trieschmann et al. |
| 4,114,442 A | * | 9/1978 | Pratt .............................. 374/113 |
| 4,135,044 A | | 1/1979 | Beals |
| 4,339,412 A | | 7/1982 | Durand et al. |
| 4,804,725 A | | 2/1989 | Kanne et al. |
| 2007/0060721 A1 | * | 3/2007 | Muhle et al. .................... 526/59 |
| 2010/0087606 A1 | * | 4/2010 | Karjala et al. .................. 526/64 |

OTHER PUBLICATIONS

Ehrlic et al, fundamentals of the free-radical polymerization of ethylene, Adv. Polymer Sci., 1970, vol. 7, pp. 386-448.

* cited by examiner

*Primary Examiner* — Natalia Levkovich
(74) *Attorney, Agent, or Firm* — Kenneth H Johnson

(57) ABSTRACT

In the high pressure of polymerization of ethylene homopolymer or copolymers conditions in the reactor may become unstable leading to the decomposition ("decomp") of the reaction mixture. Monitoring temperature excursions traveling through the reactor over close thermocouples (a roller) to detect changes in the mean temperature and the moving temperature front for a group of thermocouples detects conditions potentially leading to a decomp.

8 Claims, 5 Drawing Sheets

FIG. 1

| File | TI141 | TI142 | TI145 | TI148 | TI151 | TI154 | TI157 | TI163 | TI166 | TI169 | TI172 | Ntotal | Ncorrect | Nwrong | % |
|---|---|---|---|---|---|---|---|---|---|---|---|---|---|---|---|
| 2oct2007r | | | | ▨ | ▨ | ▨ | ▨ | ▨ | | | | 11 | 11 | 0 | 1.00 |
| 3jul2007r | | | ▨ | ▨ | ▨ | ▨ | | | | | | 11 | 11 | 0 | 1.00 |
| 6aug2007r | | | ▨ | ▨ | ▨ | | | | | | | 11 | 11 | 0 | 1.00 |
| 7may2007r | | | | ▨ | ▨ | ▨ | ▨ | | | | | 11 | 0 | 0 | 0.00 |
| 8oct2007r | | | | ▨ | ▨ | ▨ | ▨ | | | | | 11 | 11 | 0 | 1.00 |
| 12feb2008r | | | ▨ | ▨ | ▨ | ▨ | ▨ | | | | | 11 | 11 | 0 | 1.00 |
| 17nov2006r | | | ▨ | ▨ | ▨ | ▨ | ▨ | | | | | 11 | 11 | 0 | 1.00 |
| 20sep2006r | | | | ▨ | ▨ | ▨ | ▨ | ▨ | | | | 11 | 0 | 0 | 0.00 |
| 21jul2007p | | | | | ▨ | ▨ | ▨ | ▨ | | | | 11 | 11 | 0 | 1.00 |
| 23jul2007r | ▨ | ▨ | ▨ | ▨ | ▨ | ▨ | ▨ | ▨ | | | | 11 | 11 | 0 | 1.00 |
| 23may2007r | | ▨ | ▨ | ▨ | ▨ | ▨ | ▨ | ▨ | ▨ | ▨ | ▨ | 11 | 9 | 2 | 0.82 |
| 24dec2006p | | | ▨ | ▨ | ▨ | ▨ | ▨ | ▨ | ▨ | ▨ | ▨ | 11 | 7 | 4 | 0.64 |
| 25apr2007r | | | ▨ | ▨ | ▨ | ▨ | ▨ | | | | | 11 | 10 | 1 | 0.91 |
| 28dec2006r | | | ▨ | ▨ | ▨ | ▨ | | | | | | 11 | 11 | 0 | 1.00 |
| 28sep2007r | | | | ▨ | ▨ | ▨ | ▨ | | ▨ | | | 11 | 11 | 0 | 1.00 |
| 29dec2006r | | | ▨ | ▨ | ▨ | ▨ | ▨ | | | | | 11 | 10 | 1 | 0.91 |
| 29jan2007r | | | ▨ | ▨ | ▨ | ▨ | | | | | | 11 | 9 | 2 | 0.82 |
| | | | | | | | | | | | | | 11 | 0 | 1.00 |
| | | | | | | | | | | | | | 11 | | 1.00 |
| | | | | | | | | | | | | | | | 85% |

▨ temperature event on given thermocouple correctly identified by roller detector
▨ temperature event on given thermocouple not correctly identified by roller detector

ROLLER DETECTION

FIELD OF THE INVENTION

The present invention relates to the high pressure polymerization of ethylene homopolymers and co-polymers. During the high pressure polymerization of ethylene homopolymers and co-polymers there may be a "decomp" (decomposition of the monomer(s) in the tubular reactor). When this occurs there is a rapid rise in temperature and pressure within the reactor causing emergency vent valves to open in order to reduce the pressure within the reactor and vent the reactor contents. Decomps result in reactor downtime, lost production, and increased wear on reactor components. A number of strategies have been devised to modify reactor conditions in order to prevent the occurrence of a decomp in the reactor. As far as Applicants are aware there is no art to detect a moving temperature front along the reactor so steps may be taken to avoid them.

BACKGROUND OF THE INVENTION

U.S. Pat. No. 3,079,372 issued Feb. 26, 1963 to Fulkner et al., assigned to Union Carbide discloses a method to divert decomp product (e.g. carbon contaminated polyethylene) out of a reactor. A number of temperature probes along the length of a tubular reactor are rapidly scanned (60 times per second) and if there is a temperature rise above a preset point (about 1000° C.) a valve opens and the contaminated product is vented away from the final product. However the process does not appear to be predictive based on any particular calculation or a mean temperature. Rather it seems 55 to be based on a trial producing decomposition conditions where the temperature is achieved at a single thermocouple.

U.S. Pat. No. 3,781,256 issued Dec. 25, 1973 in the name of Sadee et al., assigned to Stamicarbon N. V. teaches a method to suppress "aerials" an ignition of the reactor contents issued into the atmosphere as a result of a decomposition. Aerials are prevented by introducing water into the reactor contents expelled into the atmosphere within 10 seconds after the reactor safety device has been activated. The patent does not suggest any method for identifying conditions leading to or predicting a decomposition.

U.S. Pat. No. 4,339,412 issued Jul. 13, 1982 to Durand et al, assigned to Societe Chimiques des Charbonnages CdF Chimie, teaches a method to prevent aerials by having gases from a reactor in which a decomposition has occurred, vent into an evacuation pipe in which there is an inert atmosphere. Apparently, the pressure wave from the decomposition travels in excess of the speed of sound and heats air in an evacuation chamber to the ignition point of ethylene. The patent does not teach a method to detect or predict decompositions.

U.S. Pat. No. 4,804,725 issued Feb. 14, 1989 to Kane et al. assigned to BASF Aktiengesellschaft discloses a process where sections of a high pressure tubular reactor are let down after a temperature or pressure exceeds a set point in that section. The contents of the other reactor sections are recycled. This minimizes the amount of reactants, and decomposition material released into the atmosphere. In the patent the control system is for example a commercial measuring and regulating systems (for example AEG Logistat control), by means of which a number of hydraulic valves are controlled. The patent suggests the system is activated when a pressure or temperature is exceeded. The process does not teach a process similar to that of the present invention.

The present invention seeks to provide a method to detect the onset of conditions associated with an increased likelihood in conditions leading to decomposition permitting the conditions in the reactor to be altered to prevent or reduce the likelihood of a decomposition.

SUMMARY OF THE INVENTION

The present invention provides a method to detect process temperature anomalies associated with an increased likelihood in conditions leading to decomposition of a polymerizing mixture of 100 to 60 weight % of one or more $C_{2-8}$ alpha olefins and 0 to 40 weight % of one or more monomers selected from the group consisting of vinyl acetate; $C_{3-6}$ ethylenically unsaturated carboxylic acids and $C_{1-4}$ alkyl esters thereof in the presence of one or more initiators selected from the group consisting of oxygen, hydrogen peroxide, organic peroxides, persulfates, perborates, percarbonates, organic azo compounds at pressures from 80 to 310 MPa and temperatures from 130 to 350° C. in a tubular reactor having n thermocouples along the length of the reactor where n is a whole number between 100 and 350 comprising:

i) starting or moving the reactor to a set of operating conditions to produce a desired product and after it has reached on line steady state conditions taking sufficient temperature readings over a period of time of not less than thirty seconds and not more than 5 minutes through the thermocouples to establish the mean temperature, standard deviation, and moving range for each thermocouple for that given time period;

ii) analyzing the next sequential segment of temperature process data covering not less than 30 seconds and not more than 5 minutes that were acquired at a frequency of not less than 10 Hertz (e.g. 10 times per second so in 30 seconds there are 300 data points) to determine if, for any given thermocouple, there is a temperature excursion between $3\delta$ and $6\delta$ above the established mean temperature and the difference between the current data point and the prior data point (moving range) exceeds a predetermined threshold, that extends across two or more thermocouples; and (iii) recalculating the mean temperature and the standard deviation using the current segment of data if both conditions are not met.

In a further embodiment, if across two or more thermocouples there is temperature excursion greater than $3\delta$ above the mean temperature and the moving range also exceeds a predetermined threshold for a given thermocouple steps are taken to reduce the rate of reaction.

In a further embodiment the reaction temperature is from 150 to 340° C.

In a further embodiment the pressure is from 200 to 290 MPa.

In a further embodiment in step i) not less than 300 measurements are taken to establish the mean reaction temperature and standard deviation.

In a further embodiment in step ii) the frequency of analyzing the temperature data is not less than once every thirty seconds.

In a further embodiment in step ii) the temperature excursion must be observed over not less than 3 thermocouples.

In a further embodiment in step ii) the sequential segments of temperature process data covering not less than 45 seconds.

In a further embodiment the data are analyzed using a microprocessor.

In a further embodiment the microprocessor is part of a process control system controlling the reaction process.

In a further embodiment the mean temperature is from 200 to 340° C.

In a further embodiment the mixture comprises 100 to 80 weight % of one or more $C_{2-8}$ alpha olefins and 0 to 20 weight % of one or more compounds selected from the group consisting of vinyl acetate and $C_{3-6}$ ethylenically unsaturated carboxylic acids and $C_{1-4}$ alkyl esters thereof.

In a further embodiment the monomer mixture comprises ethylene and propylene.

BRIEF DESCRIPTION OF THE DRAWINGS

FIG. 1 summarizes the performance of the roller detector when validated against historical sets of high speed process data (i.e. temperature measurements). The program had a success rate of 85% in detecting the process temperature anomalies seen on individual thermocouples. All of these cases would have been correctly identified as "rollers".

DETAILED DESCRIPTION

As used in this specification roller means a temperature excursion travelling through the reactor which may indicate an increased likelihood of a decomp occurring.

Figure 5:
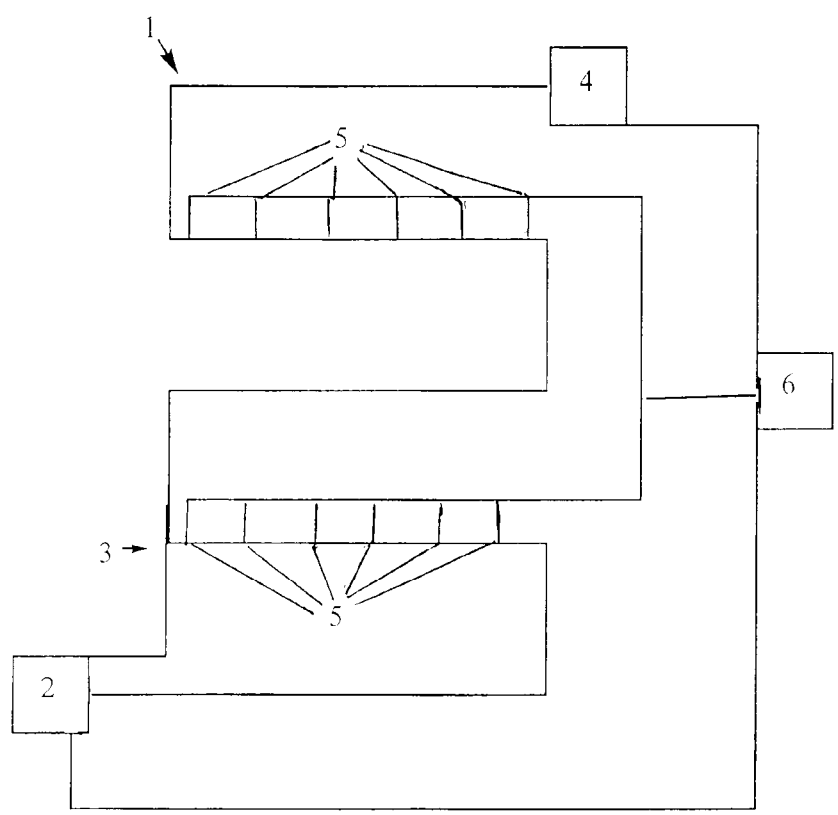
FIG. 5 is a schematic diagram of a tubular reactor in accordance with the present invention.

The present invention will be described in the context of FIG. 5 which shows a tubular reactor 1, having an inlet 2, injection point 3, an outlet 4, and a number of thermocouples 5 connected a microprocessor 6. Microprocessor 6 is a part of a process control system controlling the reaction process.

Polyethylene was originally produced industrially using a high pressure process. Although the process has been modified over time it essentially comprises compressing ethylene to a high enough pressure so that it becomes a supercritical fluid. Typically the pressures range from about 80 to 310 MPa (e.g. about 11,500 psi to about 45,000 psi) preferably from about 200 to 300 MPa (about 30,000 psi to about 43,500 psi) and the temperature ranges from 130° C. to 350° C., typically from 150° C. to 340° C. The supercritical ethylene together with one or more of initiators, chain transfer agent and optional comonomers are fed to a high pressure reactor. The reactor may be a tubular reactor. Tubular reactors may have a length from about 200 m to about 1500 m, and a diameter from about 20 mm to about 100 mm.

Thermocouples are along the length of the reactor typically spaced at a distance from 5 to 15, preferably 8 to 12, most preferably from 8 to 11 meters. Generally there may be from 100 and 350 thermocouples, typically from 120 to 300 thermocouples spaced along the length of the reactor. The spacing of the thermocouples may not always be uniform along the length of the reactor.

Generally there are a number of injection points spaced along the tubular reactor where additional components such as initiators, chain transfer agents, and monomers (preferably cold monomers), may be added to the reactor. The design and operation of tubular reactors is illustrated by a number of patents including for example U.S. Pat. No. 3,334,081 issued Aug. 1, 1967 to Madgwick et al, assigned to Union Carbide Corporation; U.S. Pat. No. 3,399,185 Issued Aug. 27, 1968 to Schappert assigned to Koppers Company, Inc., U.S. Pat. No. 3,917,577 issued Nov. 4, 1975 to Trieschmann et al. assigned to Badische Anilin & Soda-Fabrik Aktiengesellschaft; and U.S. Pat. No. 4,135,044 issued Jan. 16, 1979 to Beals assigned to Exxon Research & Engineering Co.

Generally the initiator, or mixture of initiators, is injected into the reactor in amounts from 100 to about 500 ppm, preferably from about 125 to 425, (based on the weight of the reactants). The initiator(s) may be selected from the group consisting of oxygen, peroxides, persulphates, perborates, percarbonates, nitriles, and sulphides (methyl vinyl sulphide). Some free radical initiators can be selected from the list given in Ehrlich, P., et al., Fundamentals of the Free-Radical Polymerization of Ethylene, Advances in Polymer Science, Vol. 7, pp. 386-448, (1970).

Non-limiting examples of some free radical producing substances include oxygen (air); peroxide compounds such as hydrogen peroxide, decanoyl peroxide, t-butyl peroxy neodecanoate, t-butyl peroxypivalate, 3,5,5-trimethyl hexanoyl peroxide, diethyl peroxide, t-butyl peroxy-2-ethyl hexanoate, t-butyl peroxy isobutyrate, benzoyl peroxide, t-butyl peroxy acetate, t-butyl peroxy benzoate, di-t-butyl peroxide, and 1,1, 3,3-tetramethyl butyl hydroperoxide; alkali metal persulfates, perborates and percarbonates; and azo compounds such as azo bis isobutyronitrite. Typically initiators are selected from the group consisting oxygen (air) and organic peroxides.

Generally a chain transfer agent (sometimes referred to as a telogen or a modifier) is also present in the reactants. The chain transfer agent may be added at one or more points along the tubular reactor. Some chain transfer agents include the saturated aliphatic aldehydes, such as formaldehyde, acetaldehyde and the like, the saturated aliphatic ketones, such as acetone, diethyl ketone, diamyl ketone, and the like, the saturated aliphatic alcohols, such as methanol, ethanol, propanol, and the like, paraffins or cycloparafins such as pentane, hexane, cyclohexane, and the like, aromatic compounds such as toluene, diethylbenzene, xylene, and the like, and other compounds which act as chain terminating agents such as carbon tetrachloride, chloroform, etc.

The chain transfer agent may be used in amounts from about 0.20 to 2, preferably from 0.24 to 1 mole percent based on the total ethylene feed to the reactor.

The feed may be entirely ethylene or may be a mixture of ethylene and one or more comonomers. Typically the comonomers, if present are present in amounts of less than about 20 weight %, preferably less than 10 weight %, typically for copolymers without a functional group less than 5 weight %, based on the total weight of the feed.

Some comonomers that may be copolymerized with ethylene under high pressure conditions include:

olefins such as propylene, butene-1, cis-butene-2, trans-butene-2, isobutylene, 3,3,-dimethylbutene-1, hexane-1,4-methylpentene-1, and octene-1;

$C_{3-6}$ ethylenically unsaturated carboxylic acids including methacrylic acid, crotonic acid, maleic acid, methyl hydroxy, maleate, itaconic acid;

$C_{1-6}$, preferably $C_{1-4}$ alkyl esters of $C_{3-6}$ ethylenically unsaturated carboxylic acids including: acrylic-type esters such as methyl acrylate, ethyl acrylate, n-butyl acrylate, t-butyl acrylate, 2-ethylhexyl acrylate, methyl methacrylate, n-butyl methacrylate, t-butyl methacrylate, cyclohexyl methacrylate, 2-ethylhexyl methacrylate; amides of $c_{3-6}$ethylenically unsaturated carboxylic acids such as dimethylacrylamide, N-isopropylacrylamide, N-t-butylacrylamide, N-phenylacrylamide, diacetone acrylamide, methacrylamide, N-phenylmethacrylamide, N-ethylmaleimide, and vinyl esters such as vinyl acetate, vinyl butyrate, vinyl pivalate, vinyl ethers such as vinyl methyl ether, vinyl n-butyl ether; vinyl phenyl ether, vinyl beta-hydroxy-ethyl ether, and vinyl dimethylamino-ethyl ether.

Additional potential comonomers include:

haloolefins such as vinyl fluoride, vinylidene fluoride, tetrafluoroethylene, vinyl chloride, vinylidene chloride, tetrachloroethylene, and chlorotrifluoroethylene; glycidyl methacrylate, beta-hydroxethyl methacrylate, beta-hydroxpropyl methacrylate, 3-hydroxy-4-carbo-methoxyphenyl methacrylate, N,N-dimethylaminoethyl methacrylate, t-butylaminoethyl methacrylate, 2-(1-aziridinyl) ethyl methacrylate, diethyl fumarate, diethyl maleate, and methyl crotonate; acrylonitrile, fumaronitrile, and maleic anhydride; and other compounds such as allyl alcohol.

The ethylene and comonomer, preferably a $C_{4-6}$ alpha olefin, initiator and chain transfer agent are pressurized to the required pressure and are fed to the reactor, typically at several injection points. When the reactor has reached steady state conditions after startup or a grade change then sufficient temperature readings are taken over a period of time of not less than thirty seconds and generally not more than about 10 minutes, preferably not more than 5 minutes, through the thermocouples to establish the mean temperature, standard deviation, and moving range for each thermocouple for that given time period. The raw data for a given period may or may not then be divided into shorter time sequences (say 30 second periods) to establish initial limits. Typically there would be not less than 30, preferably not less than 60 thermocouples along the length of the tubular reactor.

For each thermocouple:
(i) these readings are compared to the mean temperature for that thermocouple is between three and six, times the standard deviation in temperature ($3\delta$ to $6\delta$) for that thermocouple. Typically the mean temperature plus three to six times the standard deviation in temperature for the thermocouple is taken as the upper control limit for that thermocouple. Similarly the mean temperature minus three times the standard deviation for temperature for that thermocouple is taken as the lower control limit for that thermocouple, and
(ii) the absolute temperature differences between subsequent readings for a given thermocouple (i.e. $T_i - T_{i-1}$ (the moving range the temperature difference between the current temperature for the thermocouple and the prior measured temperature) are calculated and compared to a predetermined maximum temperature difference threshold ($\Delta T$).

Care needs to be taken in selecting the temperature difference against which the moving range is compared. If it is set too high the process will not detect conditions leading to a decomposition. If it is set too low the roller detector will give false positive results. Typically the ($\Delta T$ will be between 0.5 and 1.3, preferably between 0.7 and 1° C.

If the control limits for both (i) and (ii) are not met on 2 or more adjacent thermocouples then that data set is used to recalculate the mean temperature and the standard deviation for each thermocouple. This provides a thirty second recalculation for a rolling calculation for the mean temperature and the standard deviation of the reaction.

If both conditions (i) and (ii) are met but it appears there is a statistical movement in the direction of increasing the likelihood of a decomposition the reactor conditions (e.g. temperatures, initiator feed rate, cooling water temperature, pressure etc.) may be adjusted. Care needs to be taken in deciding if reactor conditions need to be adjusted as this may result in a change in polymer properties.

If the control limits for both (i) and (ii) are met on 2 or more typically 4, preferably 5 or more, preferably closely spaced (in some instances adjacent) thermocouples then there is a greater than 85, preferably greater than 90% probability that conditions leading to an increased likelihood of a decomp exist.

Steps are immediately taken to reduce the rate of reaction. For example the coolant temperature could be increased, or the inlet temperature of the reactants could be increased by not less than 5° C., preferably not less than 10° C. or the reactor peak temperatures decreased.

In order to implement the present invention it is necessary to have the output from the thermocouples connected to a high speed central processing unit (e.g. computer) programmed to calculate the mean temperature and the standard deviation and calculate the temperature control limits for each thermocouple and additionally to calculate the absolute temperature difference between sequential measurements and to compare those measurements to those control limits over two or more thermocouples. As noted above this is calculated at a frequency of not less than 10 times, typically from 10 to 100, preferably form 15 to 80 per second for a given time interval (e.g. from 30 seconds to 5 minutes). At a frequency of 15 measurements per second for a 30 second interval there would be 450 data points for each thermocouple.

While the above is described in terms of numbers the calculations may be normalized.

The present invention will now be illustrated by the following non limiting example.

About a 2 year sample of data from NOVA Chemicals' high pressure polyethylene plant was analyzed for "rollers". Spectral analysis of the process was not sensitive enough discriminate between rollers (temperature excursions) and changes in operating conditions (e.g. feed conditions) to provide reliable data relative to rollers.

The individual control chart on its own was also not sensitive enough to provide a good indicator of the presence of a "roller".

However, a combination of the individual control chart (mean temperature and mean temperature plus three standard deviations together with a moving range control chart taken over 2 or more thermocouples provided a good method of detecting the presence of these rollers. That is when both sets of control limits are exceeded.

FIG. 1 is a table of plant data compared to the calculations of the present invention showing when rollers had been observed by the plant (shaded areas) and where they were calculated based on the present invention. The value at the bottom right of the table is the average accuracy of the predictive method of the present invention. —85%. FIG. 1 shows the validation of the process of the present invention. However this is likely a minimum because it is calculated using individual thermocouples and it does not discount situation where multiple rollers occurred in the same data set, or the fact that at least 3 other thermocouples detected a roller.

Figure 2:
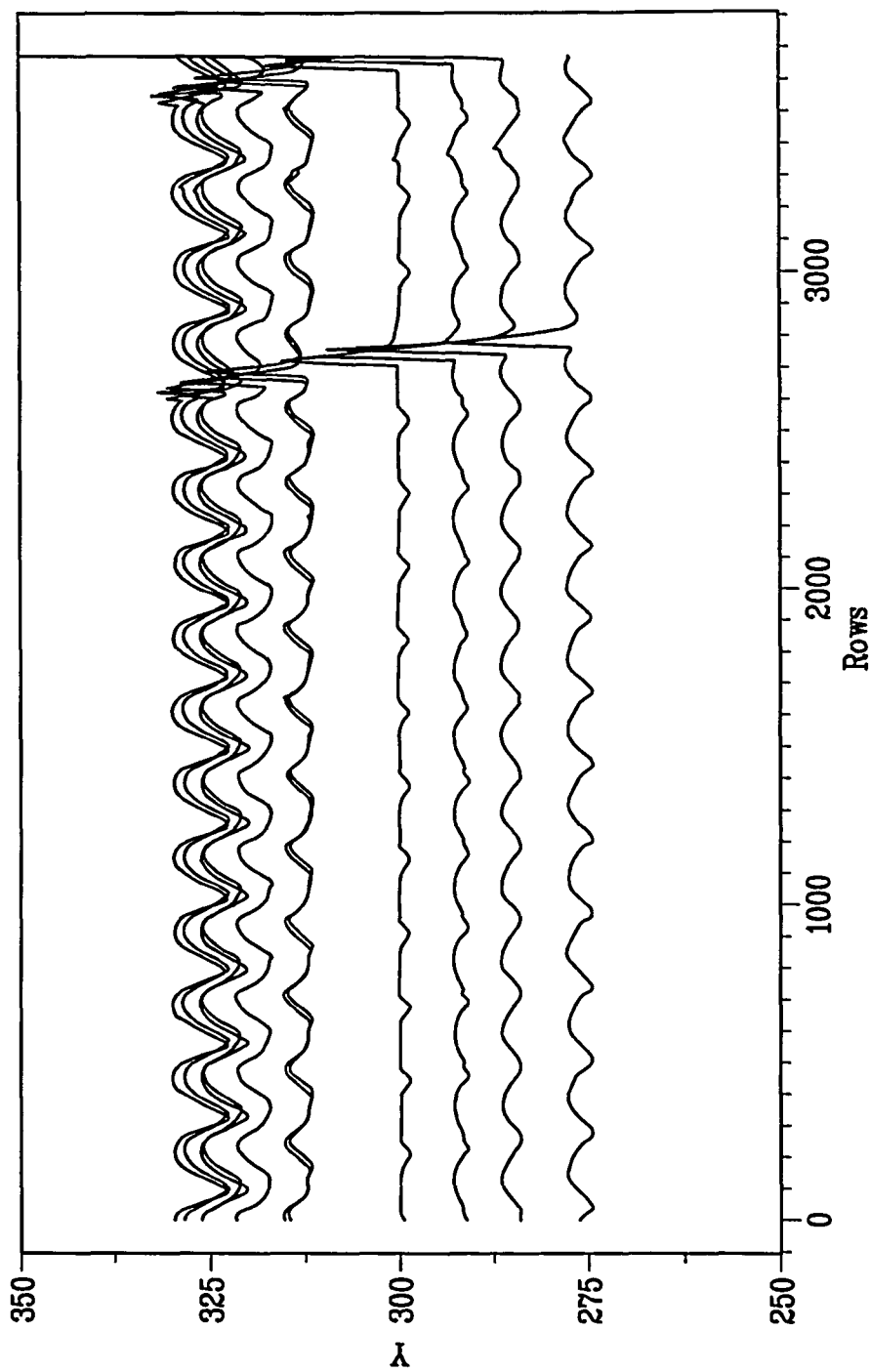
FIG. 2: shows a series of high speed process temperature measurements showing a typical "roller" event.
Figure 3:
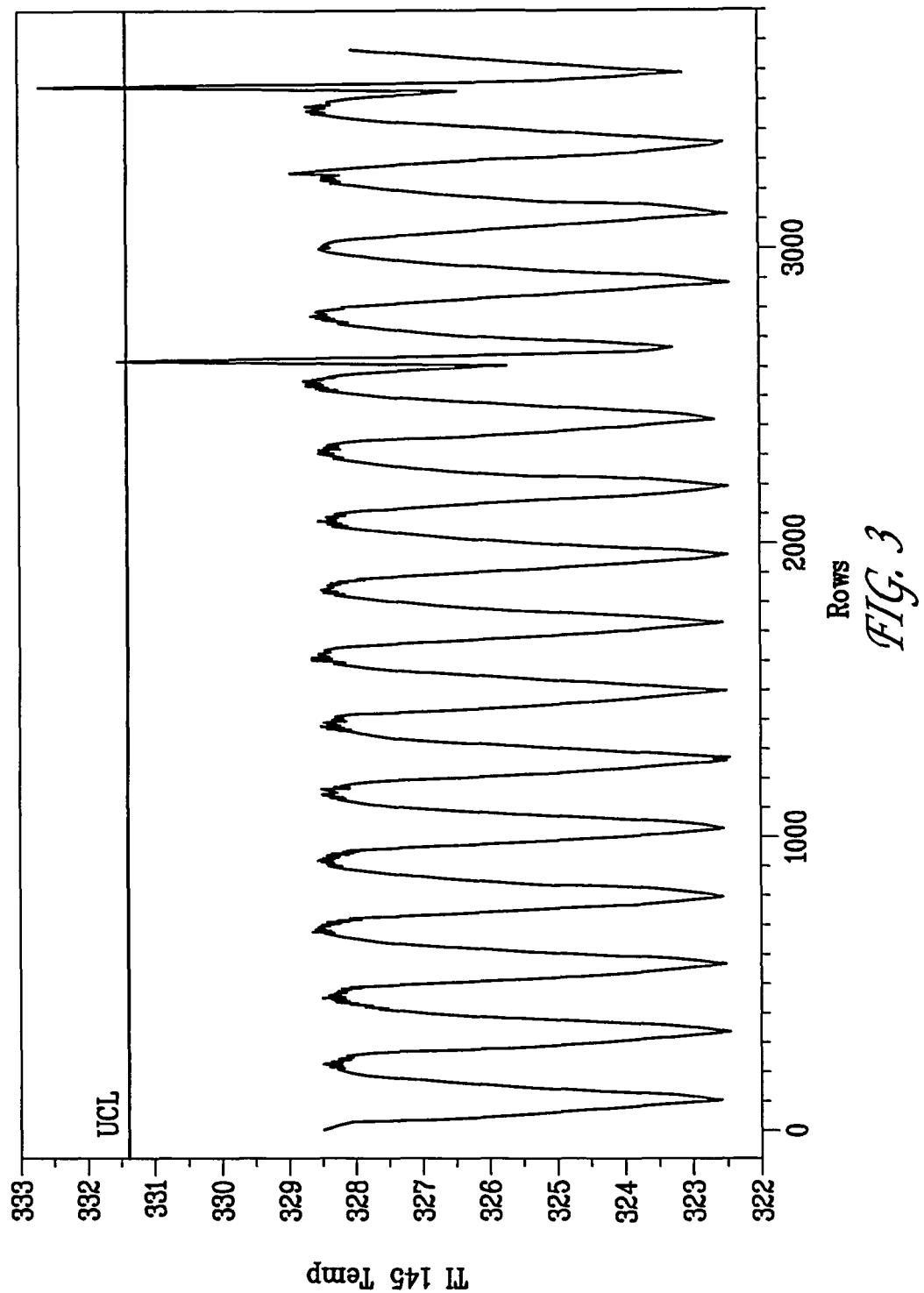
FIG. 3: shows the high speed process temperature measurements for 1 thermocouple from FIG. 1. Note the temperature excursion above the upper control limit (UCL) for this thermocouple.
Figure 4:
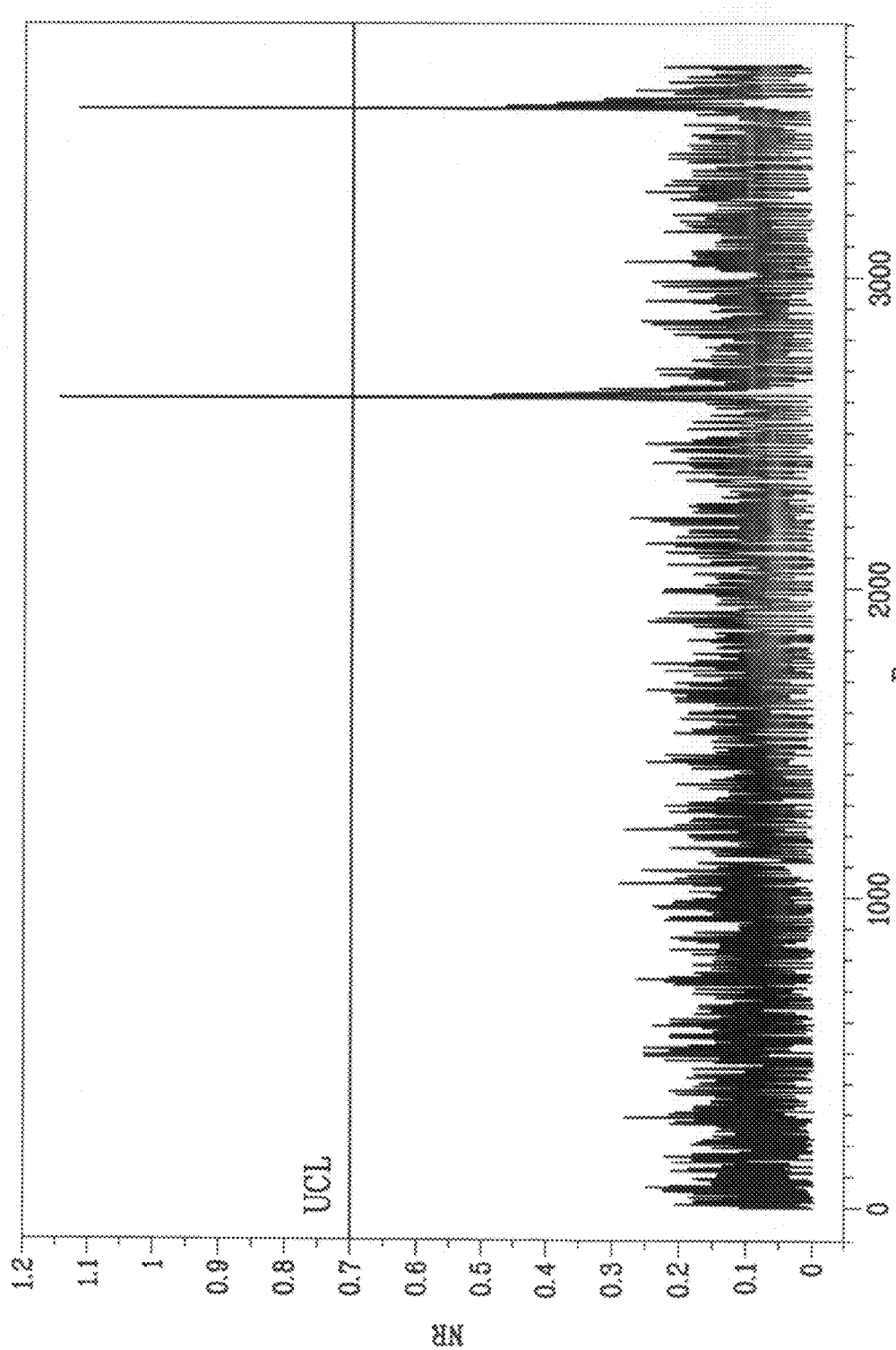
FIG. 4: shows the moving range values for the same thermocouple from FIG. 3. Note the upper control limit excursions.

FIGS. 2, 3, and 4, illustrate the types of events which may be detected by the present invention.

FIG. 2: shows a series of high speed process temperature measurements showing a typical "roller" event. The chart lines are for different spaced apart thermocouples.

FIG. 3: shows the high speed process temperature measurements for 1 thermocouple from FIG. 1. Note the temperature excursion above the upper control limit (UCL) for this thermocouple. This show one of the conditions for detection of a roller having been met.

FIG. 4: shows the moving range values for the same thermocouple from FIG. 3. Note the upper control limit excursions. This shows the second condition has been met.

What is claimed is:

1. A method to control process temperature conditions leading to an increased likelihood of decomposition of a mixture of 100 to 60 weight % of one or more $C_{2-8}$ alpha olefins and 0 to 40 weight % of one or more compounds selected from the group consisting of vinyl acetate; $C_{3-6}$ ethylenically unsaturated carboxylic acids and $C_{1-4}$ alkyl esters thereof in the presence of one or more initiators selected from the group consisting of oxygen, hydrogen peroxide, organic peroxides, persulfates, perborates, percarbonates, and organic azo compounds at pressures from 80 to 310 MPa and temperatures from 130 to 350° C. in a tubular reactor having a length from 200 m to 1500 m and a diameter from 20 mm to 110 mm having n thermocouples along the length of the reactor where n is a whole number between 100 and 350 comprising:
  i) operating the reactor at the above conditions to produce a product and taking from 10 to 100 temperature readings per second over a period of time of not less than thirty seconds and not more than 5 minutes from each thermocouple to a microprocessor programmed to calculate as based on said reading from said thermocouple the mean temperature, the standard deviation (ó), the mean temperature plus from three standard deviations (3ó) to the mean temperature plus three to six standard deviations as the control limits for each thermocouple, the absolute temperature difference between sequential measurements to determine a moving range and to compare those values to the control limits over two to five adjacent thermocouples out of said n thermocouple;
  ii) calculating with the microprocessor said mean temperature, standard deviation (ó), the mean temperature plus from three standard deviations (3ó) to the mean temperature plus six standard deviations (6ó); the mean temperature minus three sigma (3ó), the control limits for each thermocouple; and a moving range of said temperature reading values for each thermocouple for that given time period wherein said microprocessor is further programed to preform the following steps;
  iii) for the next sequential time segment covering not less than 30 seconds and not more than 5 minutes providing the microprocessor temperature readings at a frequency of not less than 10 Hertz to determine;
  iv), if:
    a) the temperature is between 3d and 6d above the established mean temperature; and
    b) the moving range exceeds a predetermined threshold between 0.5 and 1.3° C., that extends across two to five adjacent thermocouples; and
  v) if both conditions (a) and (b) are not met, for the current segment of data;
  vi) if a temperature excursion between 3d to 6d above the mean temperature and the moving range also exceeds the predetermined threshold between 0.5 and 1.3° C. for a given thermocouple that extends across two to five adjacent thermocouples using the microprocessor to increase one or more of the coolant temperature and the inlet temperature of the reactants by not less than 5° C. or decrease the reactor peak temperature.

2. The method according to claim 1, wherein said microprocessor is further programed to control the predetermined threshold against which the moving range is compared is between 0.7 and 1° C.

3. The method according to claim 2, wherein said microprocessor is further programed to control the reaction temperature is from 150 to 340° C.

4. The method according to claim 3, wherein said operating conditions include the pressure is from 200 to 300 MPa.

5. The method according to claim 4, wherein in step i) not less than 450 measurements are provided to establish the mean reaction temperature and standard deviation.

6. The method according to claim 5, wherein in step ii) the temperature excursion is observed over not less than 3 adjacent thermocouples out of said n thermocouples.

7. The method according to claim 6, wherein said microprocessor is further programed to control the mean temperature is from 200 to 340° C.

8. The method according to claim 7, where in the mixture comprises 100 to 80 weight % of one or more $C_{2-8}$ alpha olefins and 0 to 20 weight % of one or more compounds selected from the group consisting of vinyl acetate, and $C_{3-6}$ ethylenically unsaturated carboxylic acids and $C_{1-4}$ alkyl esters thereof.

* * * * *